United States Patent
Jintsugawa et al.

(10) Patent No.: US 9,201,617 B2
(45) Date of Patent: Dec. 1, 2015

(54) CONTROL DEVICE, FOR COMMUNICATING WIRELESSLY WITH A RECORDING DEVICE, A CONTROL METHOD, AND RECORDING MEDIUM

(71) Applicant: SEIKO EPSON CORPORATION, Tokyo (JP)

(72) Inventors: Kei Jintsugawa, Matsumoto (JP); Satoshi Suzuki, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 20 days.

(21) Appl. No.: 13/904,602

(22) Filed: May 29, 2013

(65) Prior Publication Data
US 2013/0321864 A1 Dec. 5, 2013

(30) Foreign Application Priority Data
May 29, 2012 (JP) ................................ 2012-121777

(51) Int. Cl.
| G06F 3/00 | (2006.01) |
| G06F 3/12 | (2006.01) |
| H04L 29/08 | (2006.01) |
| H04W 80/02 | (2009.01) |

(52) U.S. Cl.
CPC ............ *G06F 3/1236* (2013.01); *G06F 3/1204* (2013.01); *G06F 3/1292* (2013.01); *H04L 69/321* (2013.01); *H04W 80/02* (2013.01)

(58) Field of Classification Search
CPC ... G06F 3/1236; G06F 3/1292; G06F 3/1204; H04L 69/321; H04W 80/02
USPC .................................... 358/1.1–1.16
See application file for complete search history.

(56) References Cited

U.S. PATENT DOCUMENTS

| 2002/0159090 A1* | 10/2002 | Nobutani et al. ............ 358/1.15 |
| 2005/0027918 A1* | 2/2005 | Govindarajulu et al. ..... 710/313 |
| 2006/0277275 A1* | 12/2006 | Glaenzer ...................... 709/219 |
| 2007/0204069 A1* | 8/2007 | Bhesania et al. .................. 710/8 |
| 2013/0229930 A1* | 9/2013 | Akay et al. .................... 370/252 |

FOREIGN PATENT DOCUMENTS

| JP | 2000-347825 A | 12/2000 |
| JP | 2002-229878 A | 8/2002 |
| JP | 2006-011809 A | 1/2006 |
| KR | 1020050054787 A | 6/2005 |

* cited by examiner

*Primary Examiner* — Benny Q Tieu
*Assistant Examiner* — Michael Y Tzeng
(74) *Attorney, Agent, or Firm* — Hauptman Ham, LLP

(57) ABSTRACT

A control device includes a recording control unit, a detection unit, a port selection unit and a communication control unit. The recording control unit configures a logical port for data communication according to an interface standard. The detection unit detects a recording device wirelessly communicable with the control device. The port selection unit links a virtual port corresponding to the detected recording device with the logical port. The communication control unit opens the virtual port linked to the logical port and the recording device for wireless data communication with the recording device according to a wireless communication standard.

20 Claims, 5 Drawing Sheets

18a

| VIRTUAL COM PORT NAME | SETTINGS INFORMATION | PRINTER ID INFORMATION |
|---|---|---|
| VIRTUAL COM PORT NAME CP1 | SETTINGS INFORMATION SJ1 | MAC ADDRESS MA1 |
| VIRTUAL COM PORT NAME CP2 | SETTINGS INFORMATION SJ2 | MAC ADDRESS MA2 |
| • • • | • • • | • • • |

18a

| VIRTUAL COM PORT NAME | SETTINGS INFORMATION | PRINTER ID INFORMATION |
|---|---|---|
| VIRTUAL COM PORT NAME CP1 | SETTINGS INFORMATION SJ1 | MAC ADDRESS MA1 |
| VIRTUAL COM PORT NAME CP2 | SETTINGS INFORMATION SJ2 | MAC ADDRESS MA2 |
| ... | ... | ... |

CONTROL DEVICE, FOR COMMUNICATING WIRELESSLY WITH A RECORDING DEVICE, A CONTROL METHOD, AND RECORDING MEDIUM

RELATED APPLICATION(S)

The instant application claims the benefit of Japanese patent application No. 2012-121777 filed May 29, 2012, the entire disclosure of which is incorporated by reference herein.

BACKGROUND

1. Technical Field

The present disclosure relates to a control device for communicating wirelessly with a recording device, a control method of the control device, a recording medium storing a program for controlling the control device, and a system having the control device.

2. Related Art

Systems in which a host device and a printer communicate using a near-field wireless communication standard such as Bluetooth® are known from, for example, Japanese Unexamined Patent Appl. Pub. JP-A-2006-11809.

Generally, user intervention is performed to connect one of plural printers with the host device. For example, the user performs specific tasks such as manually selecting a printer to be connected from among the printers registered in the host device, and/or manually inputting the information required to make a connection.

SUMMARY

In some embodiments, a control device comprises a recording control unit, a recording device detection unit, a port selection unit, and a communication control unit. The recording control unit is configured to generate control data, configure a logical port, and output the control data to the logical port according to a specific interface standard. The recording device detection unit is configured to detect a recording device wirelessly communicable with the control device. The port selection unit is configured to link a virtual port corresponding to the detected recording device with the logical port for enabling wireless communication with the recording device. The communication control unit is configured to open the virtual port linked to the logical port and corresponding to the recording device, convert the control data input to the virtual port via the logical port according to a wireless communication standard, transmit the converted control data wirelessly to the recording device corresponding to the virtual port, and output reception data received wirelessly from the recording device according to the specific interface standard to the logical port.

In a control method performed by a control device in accordance with some embodiments, control data is generated, a logical port is configured, and the control data is outputted to the logical port according to a specific interface standard. A recording device wirelessly communicable with the control device is detected. A virtual port corresponding to the detected recording device is linked with the logical port for enabling wireless communication with the recording device. The virtual port linked to the logical port and the recording device is opened. The control data input to the virtual port via the logical port is converted according to a wireless communication standard. The converted control data is wirelessly transmitted to the recording device linked to the virtual port. Reception data received wirelessly from the recording device is outputted according to the specific interface standard to the logical port.

In some embodiments, a non-transitory computer-readable recording medium stores a program for, when executed by a control unit of a control device, causing the control unit to function as a recording control unit, a recording device detection unit, a port selection unit, and a communication control unit. The recording control unit is configured to generate control data, configure a logical port, and output the control data to the logical port according to a specific interface standard. The recording device detection unit is configured to detect a recording device wirelessly communicable with the control device. The port selection unit is configured to link a virtual port corresponding to the detected recording device with the logical port for enabling wireless communication with the recording device. The communication control unit is configured to open the virtual port linked to the logical port and corresponding to the recording device, convert the control data input to the virtual port via the logical port according to a wireless communication standard, transmit the converted control data wirelessly to the recording device corresponding to the virtual port, and output reception data received wirelessly from the recording device according to the specific interface standard to the logical port.

In some embodiments, a system comprises at least one control device as defined herein above, and a plurality of recording devices configured to wirelessly communicate with the at least one control device.

BRIEF DESCRIPTION OF THE DRAWINGS

FIG. 5 is a diagram that shows an example of a virtual COM port table according to some embodiments.

DESCRIPTION OF EMBODIMENTS

Some embodiments of the present invention are described below with reference to the accompanying figures.

Figure 1:
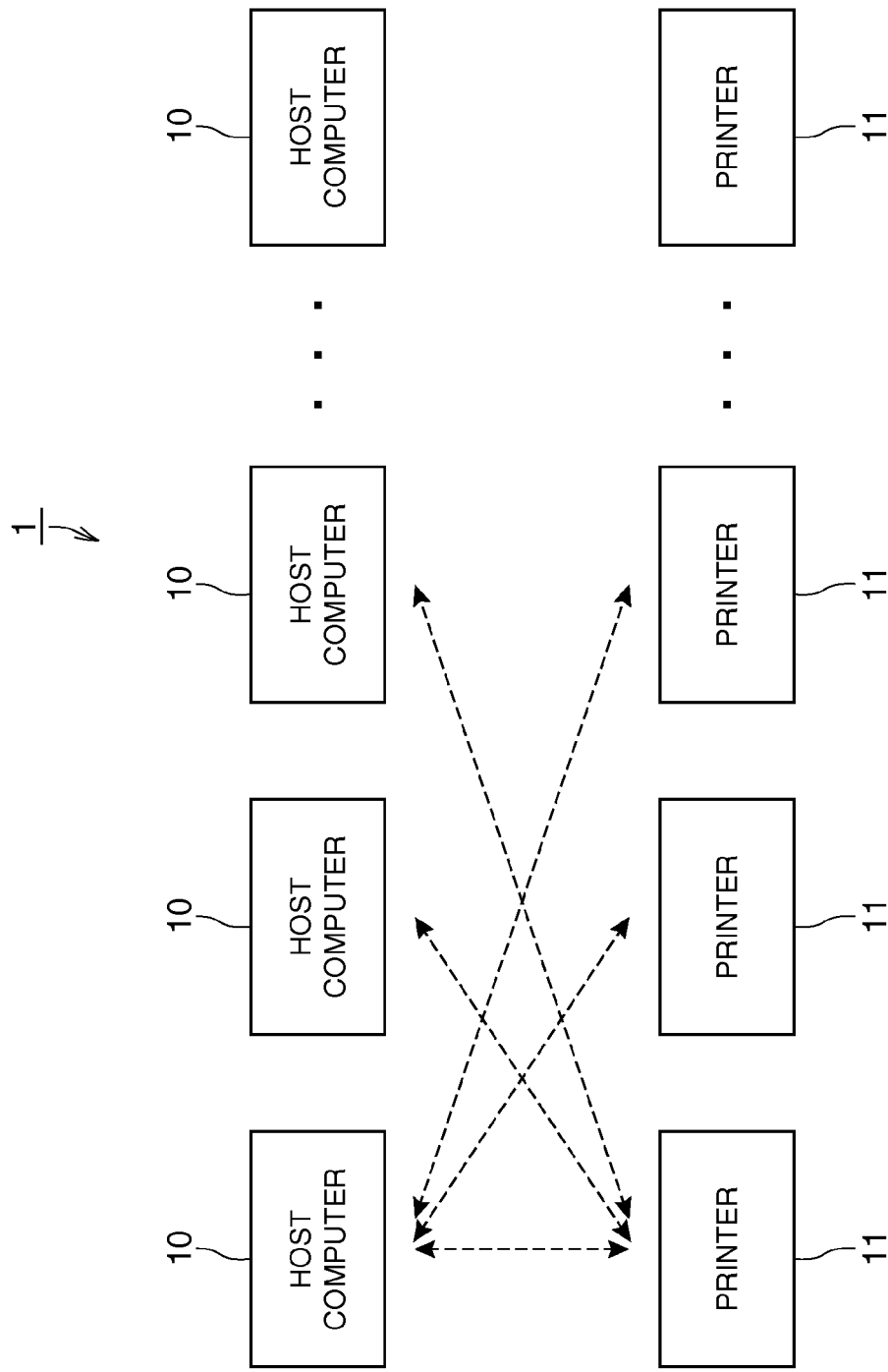
FIG. 1 is a schematic diagram of a recording system according to some embodiments.

FIG. 1 is a schematic diagram of a recording system 1 according to some embodiments of the invention.

The recording system 1 includes a plurality of host computers 10 (control devices) and a plurality of printers 11 (recording devices).

In at least one embodiment, one or more of the host computers 10 is a compact, portable device. The host computer 10 may be, for example, a tablet computer or a mobile terminal, such as those used by delivery services (e.g., parcel delivery services). In at least one embodiment, one or more of the printers 11 is also a small, portable device that can produce tickets, receipts or the like, by recording on internally stored roll paper and then cutting the paper appropriately.

In some embodiments of the invention, the host computers 10 and printers 11 are used in a parcel delivery system as described below.

Plural printers 11 are provided at a distribution center of the parcel delivery service. When a parcel deliveryman (or driver) goes on his rounds, he selects any one printer 11 (not a specific, predetermined printer 11) from among the plural available printers 11, and uses the selected printer 11 and the host computer 10 assigned to the driver while making deliveries. The host computer 10 and printer 11 are Bluetooth® devices that can communicate wirelessly with each other and are configured to produce tickets on which specific images are recorded by the printer 11 as controlled by the host computer 10. When delivering a parcel to a customer, for example, the deliveryman inputs to the host computer 10 and operates the printer 11 to produce a receipt that is given to the customer, or to produce a label to be applied to the parcel.

Because the deliveryman selects any one printer 11 from among the group of plural available printers 11, the host computer 10 is configured to connect to any one of the printers 11.

Figure 2:
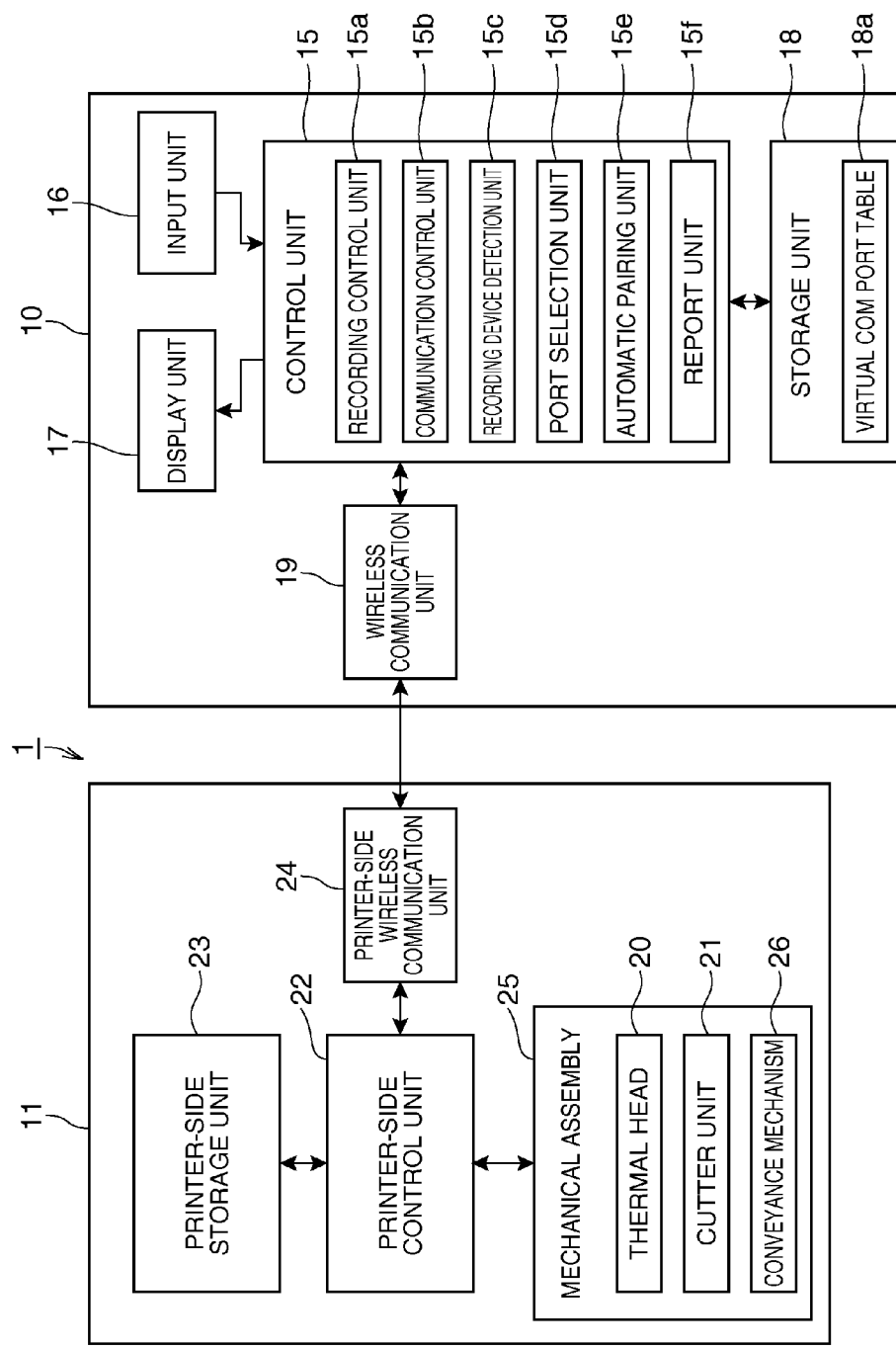
FIG. 2 is a block diagram of a host computer and a printer according to some embodiments.

FIG. 2 is a block diagram of the host computer 10 and printer 11 in accordance with some embodiments.

As shown in FIG. 2, the host computer 10 includes a control unit 15, input unit 16, display unit 17, storage unit 18, and wireless communication unit 19.

The control unit 15 includes a CPU, ROM, RAM, and other peripheral circuits, and centrally controls various parts of the host computer 10. Other types of memories are within the scope of various embodiments. The functions of the control unit 15 are further described below.

The input unit 16 is connected to a touch panel, operating switches, or other input means, detects operation of these input means, and outputs to the control unit 15. The display unit 17 includes an LCD panel or other type of display panel, and displays information on the display panel as controlled by the control unit 15. The storage unit 18 includes a non-transitory computer-readable recording medium, such as non-volatile memory such as an EEPROM device, and non-volatilely stores data rewritably. Other types of storage devices are within the scope of various embodiments. A virtual COM port table 18a stored in the storage unit 18 is described below. Other types of communication ports are within the scope of various embodiments. The wireless communication unit 19 handles wireless communication with the printer 11 using the Bluetooth standard as controlled by the control unit 15, and includes a link manager, link controller, high frequency circuit, and antenna. Other wireless communication protocols are within the scope of various embodiments.

The printer 11 is a thermal recording device that stores thermal roll paper, and produces tickets such as a receipt to be handed to the customer receiving a parcel by recording an image on the thermal roll paper with a thermal head 20, and then cutting the thermal roll paper at a specific position with a cutter unit 21.

As shown in FIG. 2, the printer 11 includes a printer-side control unit 22, printer-side storage unit 23, printer-side wireless communication unit 24, and mechanical assembly 25.

The printer-side control unit 22 includes a CPU, RAM, ROM, and other peripheral circuits, and centrally controls other parts of the printer 11. Other types of memories are within the scope of various embodiments. The printer-side storage unit 23 is nonvolatile memory such as an EEPROM device, and non-volatilely stores data rewritably. Other types of storage devices are within the scope of various embodiments. The printer-side wireless communication unit 24 handles wireless communication with the host computer 10 using the Bluetooth standard as controlled by the printer-side control unit 22, although other wireless communication protocols are within the scope of various embodiments. The mechanical assembly 25 includes the foregoing thermal head 20, cutter unit 21, and a conveyance mechanism 26. To produce a ticket, the printer-side control unit 22 reads and runs previously installed firmware to record an image by means of the thermal head 20 while conveying the thermal roll paper with the conveyance mechanism 26, and then cuts the thermal roll paper with the cutter unit 21.

The basic operation whereby the host computer 10 controls the printer 11 to produce a ticket is described next with respect to the recording control unit 15a and communication control unit 15b.

Figure 3:
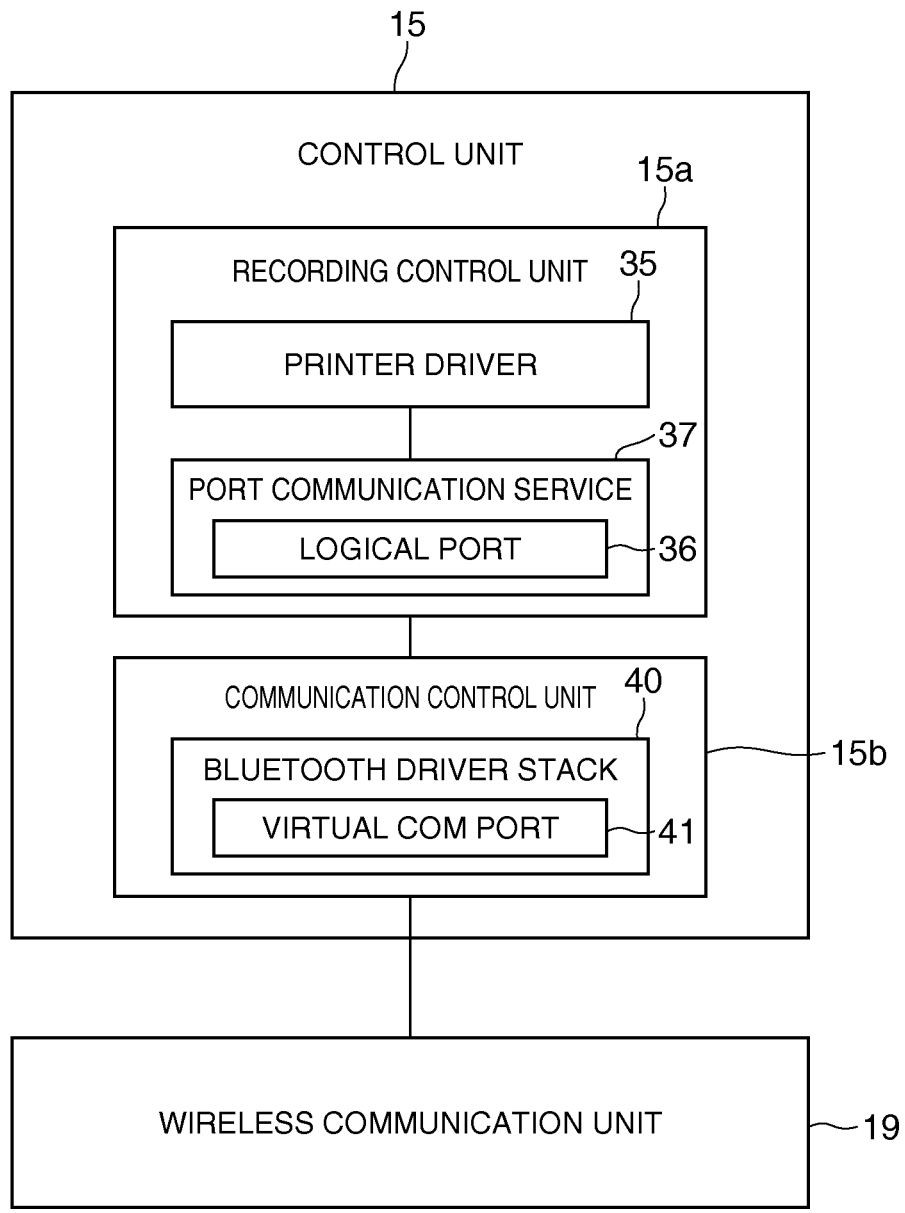
FIG. 3 is a block diagram that shows various parts of a control unit according to some embodiments.

FIG. 3 is a block diagram used to describe the configuration of various parts of the control unit 15 in accordance with some embodiments. For convenience, various functions rendered by executing one or more programs, the one or more programs, and software (logical) ports are all shown on the same level in FIG. 3.

The recording control unit 15a renders functions related to controlling the printer 11 by reading and running a printer driver 35. In order for the printer 11 to produce a ticket, the recording control unit 15a generates control commands (control data) for performing the operations required to produce a ticket through a function of the printer driver 35, and configures a logical port 36 that is opened as a software (logical) port.

Using a function of the port communication service (PCS) 37, the recording control unit 15a processes the control commands output to the logical port 36 appropriately for a specific interface, and outputs through this logical port 36 and a corresponding virtual COM port 41 (virtual port) to the communication control unit 15b. The correlation between the logical port 36 and virtual COM port 41 is described below.

The port communication service 37 is a function that can be called by the printer driver 35, and functions to handle data input/output between the recording control unit 15a and communication control unit 15b. The port communication service 37 absorbs differences between interface standards by formatting and converting data to/from the printer driver 35 according to the specific interface standard (e.g., Bluetooth, RS-232C, USB, or other) connecting the host computer 10 and printer 11, and enables communication according to different interface standards without modifying printer driver 35.

The communication control unit 15b controls the wireless communication unit 19 and communicates wirelessly with the printer 11 by reading and running a Bluetooth driver stack 40 for controlling Bluetooth hardware.

The layers of a Bluetooth stack in the communication control unit 15b include, from the bottom layer, HCI (Host Control Interface), L2CAP (Logical Link Control and Adaptive Protocol), and RFCOMM (Radio Frequency Communication)/SDP (Service Discovery Protocol) layers. The foregoing recording control unit 15a is a processing unit on the application layer.

The virtual COM port 41 is a virtual serial port (a so-called COM port) that is opened by a function of the RFCOMM layer. Data input to the printer driver 35 is made conformant to the data structure of the serial communication standard, and data input from the printer 11 to the virtual COM port 41 is output to the logical port 36 after being converted to the data structure of the serial communication standard.

A virtual COM port 41 can be opened for each printer 11 registered as connectable by the pairing operation described below. As described in further detail below, when a wireless communication link to a particular printer 11 is established, a virtual COM port 41 corresponding to one particular printer 11 is paired with a logical port 36, and data is exchanged with that particular printer 11 through the assigned virtual COM port 41.

The communication control unit 15b converts control commands input through the virtual COM port 41 to data with the data structure conforming to the RFCOMM standard on the RFCOMM layer, packetizes the stream on the L2CAP layer, and then outputs through the HCI layer to the wireless communication unit 19. The wireless communication unit 19 desirably fragments the input packets as controlled by the communication control unit 15b, and transmits to the printer 11 connected to the virtual COM port 41 through an antenna with appropriate modulation.

As described above, one host computer 10 may be connected to any of plural printers 11. In order to establish a communication link between one host computer 10 and one printer 11 so that the host computer 10 and printer 11 can communicate with each other, the host computer 10 and printer 11 are first paired with each other, and the recording control unit 15a is configured to output to the appropriate virtual COM port 41. Manual pairing might be cumbersome, and time may be wasted by manually pairing devices that have already been paired. Configuring the virtual COM port 41 might also be a complicated manual task.

To improve over the described manual operations, the host computer 10 according to some embodiments of the invention operates as follows.

Figure 4:
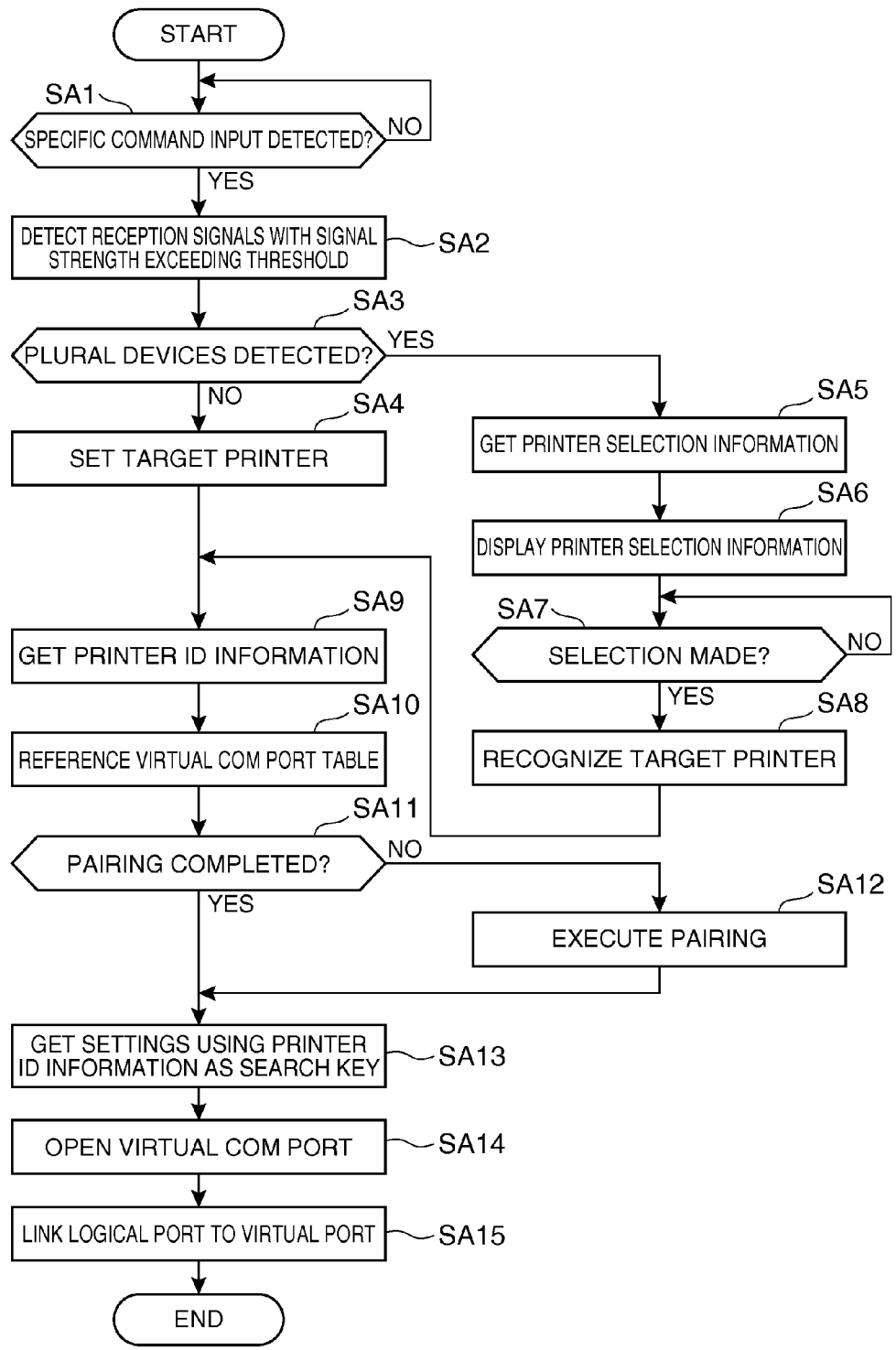
FIG. 4 is a flow chart of a control method according to some embodiments.

FIG. 4 is a flow chart of a control method performed during operation of the host computer 10 in accordance with some embodiments.

In some embodiments, the user (e.g., a deliveryman) can set either mode D1 or mode D2 as the operating mode, and FIG. 4 shows the operation of the host computer 10 when mode D1 is set. In the operation described below, one or more of the recording device detection unit 15c, port selection unit 15d, automatic pairing unit 15e, and report unit 15f functions is/are rendered by the cooperation of hardware and software, such as a CPU reading and running a program. In some embodiments, one or more components of the host computer 10 is/are implemented by hardware, e.g., by one or more application-specific integrated circuits (ASIC).

To enable the process shown in the flow chart in FIG. 4, the deliveryman performs the following tasks. First, the deliveryman selects any one printer 11 from among a group of plural available printers 11, and then places the selected printer 11 in proximity to the host computer 10 in a location where the host computer 10 is remote from the other plural printers 11. As used herein, "in proximity" means a location or distance where the reception signal strength of signals transmitted from the selected printer 11 exceeds the threshold T1 described below, and is typically 50 cm or less, for example. The deliveryman knows this distance. The process shown in the flow chart in FIG. 4 automatically establishes a wireless link between the host computer 10 and the printer 11 placed in proximity to the host computer 10, and enables wireless communication therebetween without complicated manual intervention by the user.

The control unit 15 of the host computer 10 first checks if a command for starting the process was input (step SA1). A function of the printer driver 35 in some embodiments provides a user interface for inputting commands, and the user inputs one or more commands after the user interface is displayed on the display panel of the display unit 17. Alternatively, these functions could be rendered by a dedicated software tool or other program. Mode D1 differs from mode D2 in that a command input by the user in mode D1 triggers processes related to connecting the host computer 10 and the printer 11.

When command input is detected, the recording device detection unit 15c of the control unit 15 detects the signal strength of the signals received by the wireless communication unit 19, and determines if the reception signal strength exceeds a predetermined threshold T1 (step SA2). A printer 11 transmitting signals with a reception signal strength exceeding the threshold T1 is a recording device that can be connected to communicate with the host computer 10. If such a printer 11 is not detected, the control unit 15 controls the display unit 17 to display information indicating that a printer 11 sending signals with a reception signal strength exceeding the threshold T1 was not detected, and prompting the user to set a printer 11 in proximity to the host computer 10. The following steps are executed when at least one connectable printer 11 is detected.

The reception signal strength is set in at least one embodiment by a function of the operating system of the host computer 10. The signal strength could be detected by the printer driver 35 or a function of another specialized tool.

The control unit 15 then determines if two or more (a plurality of) printers 11 were detected by the recording device detection unit 15c (step SA3).

If only one printer 11 was detected (step SA3 returns NO), the control unit 15 recognizes the detected printer 11 as the printer 11 with which to open a connection by the process described below (referred to below as the "target printer") (step SA4), and then goes to step SA9.

However, if two or more printers 11 are detected (step SA3 returns YES), the control unit 15 acquires information identifying each of the detected printers 11 ("printer selection information" below) from the recording device detection unit 15c by communicating with each detected printer 11 (step SA5). This printer selection information is information that enables the user to identify a particular printer 11, such as a name or number previously assigned to the printer 11, and could be printer ID information as described below. The printer selection information is defined in firmware in each printer 11, for example, and the control unit 15 acquires this information by communicating with the printer-side control unit 22 of each printer 11 according to a specific protocol. The report unit 15f of the control unit 15 then controls the display unit 17 to display the acquired printer selection information on the display panel in a selectable manner (step SA6). When printer selection information is selected by the user (step SA7 returns YES), the control unit 15 recognizes the printer 11 identified by the selected printer selection information as the target printer (step SA8), and then goes to step SA9.

This method causes the user to select one printer 11 when two or more printers 11 are detected with a reception signal strength exceeding the threshold T1, and recognizes the printer 11 as the target printer, thereby preventing mistakenly connecting to a printer 11 not intended by the user.

In step SA9 the control unit 15 acquires the printer ID information (identification information) of the target printer by communication with the target printer. The printer ID information is information that uniquely identifies each printer 11, and could be the MAC address or serial number of the printer 11, or an identification code embedded in firmware and/or a chip in the printer 11. In at least one embodiment of the invention, the printer ID information is the MAC address. The control unit 15 communicates with the printer-side control unit 22 of the target printer according to a specific protocol to acquire the printer ID information.

The control unit 15 then references the virtual COM port table 18a (step SA10).

FIG. 5 is a diagram that shows an example of the virtual COM port table 18a in accordance with some embodiments.

The virtual COM port table 18a is a table that, for each printer 11 for which pairing has been completed, stores the name of the corresponding virtual COM port 41 and the settings of the corresponding virtual COM port 41 correlated to the printer ID information.

The data stored in the virtual COM port table 18a is further described below while describing the pairing process. As will be understood from the following description, the pairing process has been completed for any particular printer 11 if a record containing printer ID information for that particular printer 11 is stored in the virtual COM port table 18a, and, conversely, the pairing process for that particular printer 11 has not been completed if such a record is not stored in the virtual COM port table 18a.

The control unit 15 then determines if pairing has been completed for the target printer by referencing the virtual COM port table 18a (step SA10) and, using the printer ID information of the target printer acquired in step SA9 as the search key, determines if a record containing the acquired printer ID information is found in the table (step SA11). If such a record is found in the table which indicates that pairing has been previously completed (step SA11 returns YES), the control unit 15 goes to step SA13.

If no record containing the acquired printer ID information is found in the table which indicates that pairing has not been previously completed (step SA11 returns NO), the automatic pairing unit 15e of the control unit 15 executes the pairing process (step SA12). The function of the automatic pairing unit 15e can be rendered by the Bluetooth driver stack 40, by a dedicated tool or program other than the printer driver 35, or by the cooperation of functions in different programs.

The pairing process is described below.

Pairing is the process of recognizing a specific printer 11, generating settings for and configuring a virtual COM port 41 for the specific printer 11, storing the required information in the virtual COM port table 18a, and then opening a virtual COM port 41 for the specific printer 11. The virtual COM port 41 settings are information for opening a virtual COM port 41, and include a configuration file that is referenced by the Bluetooth driver stack 40 and port communication service 37, and the content of settings stored in program variables. The communication control unit 15b can open a virtual COM port 41 based on the settings related to that virtual COM port 41.

The printer 11 and virtual COM port 41 are paired in a one-to-one (1:1) correspondence, and for the host computer 10 to communicate with a printer 11, the host computer 10 communicates through the virtual COM port 41 configured (paired) for that printer 11.

In the pairing process in step SA12, the automatic pairing unit 15e communicates with the printer-side control unit 22 of the printer 11 (the target printer), acquires the information required to generate the settings, such as a passkey (link key), based on a specific protocol, and generates the settings based on the acquired information. Next, the automatic pairing unit 15e accesses the virtual COM port table 18a, creates a record in the table, and stores the unique name and settings of the virtual COM port 41 keyed to the printer ID information in the created record.

After a record related to the virtual COM port 41 is created in the virtual COM port table 18a as described above, the virtual COM port 41 can be opened based on the settings for that virtual COM port 41, and the host computer 10 and the printer 11 paired to that virtual COM port 41 can establish a wireless link and communicate through that port. Authentication based on the acquired passkey is also used to establish the wireless link.

When the automatic pairing unit 15e finishes the pairing process, control goes to step SA13.

When pairing with a target printer has not been previously completed, in some embodiments of the invention, automatic pairing is completed by the automatic pairing unit 15e. The complicated tasks associated with manual pairing can thus be eliminated. Unnecessarily repeating the pairing process when pairing has already been previously completed for a particular device can also be prevented.

In step SA13 the communication control unit 15b of the control unit 15 references the virtual COM port table 18a, identifies the record corresponding to the target printer using the printer ID information acquired in step SA9 as the search key, and retrieves the settings for the virtual COM port 41 corresponding to the target printer. Next, the communication control unit 15b of the control unit 15 opens the virtual COM port 41 for the target printer based on the acquired settings information (step SA14).

The port selection unit 15d of the control unit 15 then links the logical port 36 to the virtual COM port 41 opened in step SA14 (step SA15).

Linking a logical port 36 to the virtual COM port 41 means making the settings required for (i) control commands input from the printer driver 35 to the logical port 36 to be output to the virtual COM port 41 linked to the logical port 36, and (ii) data received from the printer 11 to be output to the printer driver 35 through the linked virtual COM port 41 and the logical port 36. These settings are set appropriately in a configuration file of the port communication service 37, or in variables and parameters defined by the port communication service 37, for example.

By linking the logical port 36 and the virtual COM port 41 for the target printer, a wireless communication link is established between the host computer 10 and the target printer, and data can be communicated between the host computer 10 and the target printer based on a specific protocol. More specifically, control commands generated by a function of the printer driver 35 are sent to the target printer through the logical port 36 and the virtual COM port 41 for the target printer, and data sent by the target printer is output to the printer driver 35 through the virtual COM port 41 and logical port 36. In other words, the target printer can communicate wirelessly with the host computer 10.

As described above, pairing can be completed as required and communication between the host computer 10 and a desired printer 11 can be automatically enabled in some embodiments of the invention by the simple task of placing the desired printer 11 in proximity to the host computer 10.

Operation of the host computer 10 in mode D2 is described next.

The process related to connecting the host computer 10 to a printer 11 is triggered by command input from the user in mode D1 as described above, but is triggered by one or more other events as described below in mode D2.

More specifically, the recording device detection unit 15c detects the signal strength of the received signals at a specific sampling interval in mode D2. If the recording device detection unit 15c detects that the printer 11 transmitting signals with the highest reception signal strength has changed, the control unit 15 recognizes the newly detected printer 11 with the highest reception signal strength as a target printer. Alternatively or additionally, when there was no printer 11 transmitting signals with a reception signal strength exceeding the threshold T1 and the appearance of such a printer 11 is then detected by the recording device detection unit 15c, the control unit 15 recognizes the newly detected printer 11 with the reception signal strength exceeding the threshold T1, as the target printer. Once the target printer is recognized, the control unit 15 then proceeds from step SA9 in the flow chart in FIG. 4 to establish a communication link with the target printer.

An advantage of mode D2 is that the host computer 10 can connect to the most appropriate printer 11 (the printer 11 that is most likely closest) without command input from the user, but power consumption is accordingly greater due to continuous detection by the recording device detection unit 15c. Despite having the user to input a specific command in mode D1, the advantage of mode D1 is lower power consumption because continuous detection by the recording device detection unit 15c is not necessary. Considering the specifics of each mode, some embodiments of the invention enables the user to choose the operating mode of the host computer 10.

As described above, the host computer 10 in some embodiments of the invention has a recording control unit 15a that generates control commands (control data) for controlling the printer 11 and configures the logical port 36, processes the control commands passed to the logical port 36 based on a specific interface standard, and outputs to the virtual COM port 41 linked to the logical port 36; and a communication control unit 15b that converts control commands input to the virtual COM port 41 according to a specific wireless communication standard and sends the converted control commands wirelessly to the printer 11 connected to the virtual COM port 41, processes data received wirelessly from the printer 11 linked to the virtual COM port 41 according to a specific interface standard, and outputs to the logical port 36.

The host computer 10 also has a recording device detection unit 15c that detects a printer 11 with reception signal strength exceeding a threshold T1 (i.e., a printer 11 that can connect and communicate with the host computer 10); a virtual COM port 41 assigned to the printer 11 detected by the recording device detection unit 15c; and a port selection unit 15d that links the logical port 36 to the virtual COM port 41 and enables wireless communication with the detected printer 11.

When thus configured and a printer 11 is detected by the recording device detection unit 15c, the virtual COM port 41 of the printer 11 is paired with the logical port 36, and the printer 11 and host computer 10 are automatically connected so that they can communicate with each other. A communication link between the host computer 10 and a specific printer 11 can therefore be established by simply placing the selected printer 11 within a wireless communication range (i.e., in proximity) of the host computer 10.

More specifically, some embodiments use a configuration having a logical port 36 and a port communication service 37 with the ability to absorb differences in interface standards and enable communication conforming to the interface of a particular standard without modifying the printer driver 35, and achieve the foregoing effect by using the existing configuration and appropriately changing the link between the logical port 36 and a selected virtual COM port 41.

Relationships between virtual COM ports 41 and the printer ID information of the printer 11 assigned to each virtual COM port 41 are stored in the virtual COM port table 18a in some embodiments. For any given target printer (printer 11 detected by the recording device detection unit 15c), the port selection unit 15d retrieves the printer ID information for the target printer, and links the virtual COM port 41 stored for the acquired printer ID information to the logical port 36.

This configuration enables using the printer ID information for the printer 11 to identify the virtual COM port 41 linked (paired) to the target printer, and correctly link the virtual COM port 41 and logical port 36.

The host computer 10 in some embodiments of the invention also has an automatic pairing unit 15e that specifically recognizes the target printer, generates a virtual COM port 41 for the target printer, and stores this pairing information in the virtual COM port table 18a.

Some embodiments can automatically complete the pairing process for a particular printer 11 before that particular printer 11 can communicate with the host computer 10, and can link the virtual COM port 41 paired to the particular printer 11 with the logical port 36 to establish an actual communication connection, through the simple method of positioning the particular printer 11 within a communication range of the host computer 10, and thus improving user convenience.

The automatic pairing unit 15e in some embodiments registers the virtual COM port 41 generated in the pairing operation linked to the printer ID information of the target printer 11 in a virtual COM port table 18a, and when the recording device detection unit 15c detects a printer 11 from which the reception signal strength exceeds the threshold T1, gets the printer ID information of the detected printer 11, determines if a virtual COM port 41 for the detected printer 11 has been registered based on the acquired printer ID information and the printer ID information registered in the virtual COM port table 18a, and if a virtual COM port 41 has not been registered, pairs the detected printer 11 with a virtual COM port 41.

When a printer 11 that has not been paired is selected as the target printer, the automatic pairing unit 15e automatically pairs a virtual COM port 41 with the printer 11. The automatic pairing unit 15e prevents pairing another virtual COM port 41 with the printer 11, if a virtual COM port 41 has already been paired and registered for that printer 11 in the virtual COM port table 18a.

Some embodiments also enable selecting one of mode D1 and mode D2.

Because each mode has its own specifics, this configuration enables operating the control device, i.e., the host computer 10, in the appropriate operating mode.

The recording device detection unit 15c in some embodiments of the invention detects printers 11 that can connect and communicate with the host computer 10 based on the reception signal strength. The host computer 10 also has a control unit 15 that prompts the user to select one printer 11 when the recording device detection unit 15c detects two or more printers 11 transmitting signals with a reception signal strength exceeding the threshold T1. This configuration prevents the host computer 10 from mistakenly connecting with a printer 11 other than the printer intended by the user.

Several embodiments of the invention are described above, but the invention is not limited thereto. Further embodiments can be modified and adapted in many ways without departing from the scope of the instant disclosure.

For example, the recording system 1 is deployed in a package delivery system in some embodiments described above, but the recording system 1 is not limited to use in such systems. For example, the recording system 1 could be deployed in a restaurant in which a printer 11 is installed at each table (or group of tables) and the waiting staff brings a host computer 10 to each table to print receipts or tickets from the nearest printer 11. Various embodiments can thus be used in a wide range of systems in which any of plural recording devices may be connected to a particular control device.

The printer 11 in the foregoing description has a thermal head 20, but some embodiments of the invention can be used with any kind of recording head or recording method. Bluetooth is used as the standard for wireless communication above, but any current or future communication standard can be used.

One or more of the functions and/or units described with respect to FIG. 2 and/or FIG. 3 can also be achieved through the cooperation of hardware and software, and/or a particular hardware configuration (e.g., ASIC). One or more functions of the host computer 10 can also be rendered by other devices externally connected to the host computer 10. Such other devices and/or the host computer are regarded, in some embodiments, as a control device. The host computer 10 can also be configured to perform various operations by executing a program stored on an externally connected non-transitory computer-readable storage medium.

Various embodiments of the invention being thus described, it will be apparent that such embodiments may be varied in many ways. Such variations are not to be regarded as a departure from the spirit and scope of the instant disclosure, and are intended to be included within the scope of the following claims.

What is claimed is:

1. A control device, comprising:
a recording control unit configured to generate control data,
configure a logical port, and
output the control data to the logical port according to a specific interface standard;
a recording device detection unit configured to detect a recording device wirelessly communicable with the control device;
a storage unit configured to store information on a virtual port in association with identification information of the recording device corresponding to the virtual port;
a port selection unit configured to link the virtual port corresponding to the detected recording device with the logical port for enabling wireless communication with the recording device; and
a communication control unit configured to open the virtual port linked to the logical port and corresponding to the recording device, convert the control data input to the virtual port via the logical port according to a wireless communication standard, transmit the converted control data wirelessly to the recording device corresponding to the virtual port,
output reception data received wirelessly from the recording device according to
the specific interface standard to the logical port, wherein the port selection unit is configured to acquire the identification information of the recording device detected by the recording device detection unit, and link the logical port to the virtual port that has the stored information associated with the acquired identification information of the recording device, and
when multiple recording devices are detected, the control device is configured to cause recording device selection information to be displayed by a display device to enable a user to select a recording device among the detected recording devices.

2. The control device defined in claim 1, wherein the storage unit includes a plurality of records, each of the plurality of records including
the identification information of a corresponding one among a plurality of recording devices,
identification information of a virtual port associated with the corresponding recording device, and
information about settings of the virtual port.

3. The control device defined in claim 1, further comprising:
an automatic pairing unit configured to recognize the recording device detected by the recording device detection unit, generate the virtual port for the recording device, and execute a pairing process to pair the recording device with the generated virtual port.

4. The control device defined in claim 3, wherein:
the automatic pairing unit is configured to register the generated virtual port in association with identification information of the recording device in the pairing process, and
when only one recording device is detected by the recording device detection unit, the control device is configured to acquire the identification information of the detected recording device, determine if a virtual port has been registered for the detected recording device, based on the acquired identification information and the registered identification information, and cause the automatic pairing unit to execute the pairing process if a virtual port has not been registered for the detected recording device.

5. The control device defined in claim 1, wherein:
the recording device detection unit is configured to detect a recording device wirelessly communicable with the control device based on a reception signal strength; and
the control device has a first operating mode in which an operation for connecting the control device to a target recording device is triggered when the recording device detection unit (i) detects that the recording device with the highest reception signal strength has changed or (ii) detects the appearance of a recording device with the reception signal strength exceeding a predetermined threshold, and
a second operating mode in which the operation for connecting the control device to a target recording device is triggered when a specific command is input.

6. The control device defined in claim 5, wherein the control device is configured to enable user selection of one of the first and second operating modes.

7. The control device defined in claim 5, wherein:
in the first operating mode, the port selection unit is configured to link the logical port to (i) the virtual port associated with the recording device with the highest reception signal strength or to (ii) the virtual port associated with the recording device with the reception signal strength exceeding the threshold, and
in the second operating mode, the recording device detection unit is configured to detect a recording device wirelessly communicable with the control device, and the port selection unit is configured to link the logical port to the virtual port associated with the recording device detected by the recording device detection unit.

8. The control device defined in claim 1, wherein:
the recording device detection unit is configured to detect a recording device wirelessly communicable with the control device based on a reception signal strength; and
the control device further comprises a report unit configured to enable user selection of one recording device when the recording device detection unit detects two or more recording devices with the reception signal strengths exceeding a predetermined threshold.

9. A system, comprising:
at least one control device as defined in claim 1, and
a plurality of recording devices configured to wirelessly communicate with the at least one control device.

10. A control method performed by a control device, the method comprising:
- generating control data;
- configuring a logical port;
- outputting the control data to the logical port according to a specific interface standard;
- detecting a recording device wirelessly communicable with the control device;
- storing information on a virtual port in association with identification information of the recording device linked to the virtual port;
- linking the virtual port corresponding to the detected recording device with the logical port for enabling wireless communication with the recording device;
- opening the virtual port linked to the logical port and the recording device;
- converting the control data input to the virtual port via the logical port according to a wireless communication standard;
- transmitting the converted control data wirelessly to the recording device linked to the virtual port;
- outputting reception data received wirelessly from the recording device according to the specific interface standard to the logical port, and
- when multiple recording devices are detected, displaying recording device selection information by a display device to enable a user to select a recording device among the detected recording devices.

11. The control method defined in claim 10, further comprising:
- acquiring the identification information of the detected recording device; and
- linking the logical port to the virtual port that has the stored information associated with the acquired identification information of the recording device.

12. The control method defined in claim 11, wherein said storing comprises storing the information in a table with a plurality of records, each of the plurality of records including
- the identification information of a corresponding one among a plurality of recording devices,
- identification information of a virtual port associated with the corresponding recording device, and
- information about settings of the virtual port.

13. The control method defined in claim 10, further comprising:
- recognizing the detected recording device;
- generating the virtual port for the recording device; and
- executing a pairing process to pair the generated virtual port with the recording device.

14. The control method defined in claim 13, further comprising:
- registering the generated virtual port in association with identification information of the recording device in the pairing process; and
- when only one recording device is detected, acquiring the identification information of the recording device, determining if a virtual port has been registered for the detected recording device, based on the acquired identification information and the registered identification information, and executing the pairing process if a virtual port has not been registered for the detected recording device.

15. The control method defined in claim 10, wherein:
- said detecting a recording device wirelessly communicable with the control device is based on a reception signal strength; and
- the control device has
  - a first operating mode in which an operation for connecting the control device to a target recording device is triggered when (i) it is detected that the recording device with the highest reception signal strength has changes or (ii) the appearance of a recording device with the reception signal strength exceeding a predetermined threshold is detected, and
  - a second operating mode in which the operation for connecting the control device to a target recording device is triggered when a specific command is input.

16. The control method defined in claim 15, further comprising:
- enabling user selection of one of the first and second operating modes.

17. The control method defined in claim 15, wherein:
- the first operating mode includes linking the logical port to (i) the virtual port associated with the recording device with the highest reception signal strength or to (ii) the virtual port associated with the recording device with the reception signal strength exceeding the threshold, and
- the second operating mode includes
  - detecting a recording device wirelessly communicable with the control device, and
  - linking the logical port to the virtual port associated with the detected recording device.

18. The control method defined in claim 10, further comprising:
- detecting a recording device wirelessly communicable with the control device based on a reception signal strength; and
- enabling user selection of one recording device when two or more recording devices with the reception signal strength exceeding a predetermined threshold are detected.

19. A non-transitory computer-readable recording medium storing a program for, when executed by a control unit of a control device, causing the control unit to function as:
- a recording control unit configured to generate control data, configure a logical port, and output the control data to the logical port according to a specific interface standard;
- a recording device detection unit configured to detect a recording device wirelessly communicable with the control device;
- a storage unit configured to store information on a virtual port in association with identification information of the recording device corresponding to the virtual port;
- a port selection unit configured to link the virtual port corresponding to the detected recording device with the logical port for enabling wireless communication with the recording device; and
- a communication control unit configured to open the virtual port linked to the logical port and corresponding to the recording device, convert the control data input to the virtual port via the logical port according to a wireless communication standard, transmit the converted control data wirelessly to the recording device corresponding to the virtual port,
- output reception data received wirelessly from the recording device according to the specific interface standard to the logical port, and
- when multiple recording devices are detected, displaying recording device selection information by a display device to enable a user to select a recording device among the detected recording devices.

20. The non-transitory computer-readable recording medium according to claim 19, wherein when only one recording device is detected by the recording device detection unit, the control device is configured to
  acquire the identification information of the detected recording device,
  determine if a virtual port has been registered for the detected recording device, based on the acquired identification information and the registered identification information, and
  cause the automatic pairing unit to execute the pairing process if a virtual port has not been registered for the detected recording device; and
when multiple recording devices are detected, the control device is configured to cause recording device selection information to be displayed by a display device to enable a user to select a recording device among the detected recording devices.

* * * * *